(12) United States Patent
Rupp

(10) Patent No.: US 7,163,212 B1
(45) Date of Patent: Jan. 16, 2007

(54) PORTABLE TRANSPORTATION ASSEMBLY

(76) Inventor: Ronald L. Rupp, 2223-9 US-20, Fayette, OH (US) 43521

( * ) Notice: Subject to any disclaimer, the term of this patent is extended or adjusted under 35 U.S.C. 154(b) by 270 days.

(21) Appl. No.: 10/873,799

(22) Filed: Jun. 22, 2004

(51) Int. Cl.
*B62D 61/12* (2006.01)

(52) U.S. Cl. ............................... 280/43.17; 280/43.13; 280/43.22

(58) Field of Classification Search ................ 280/43, 280/43.1, 43.11, 43.12, 43.17, 79.11, 79.2, 280/43.13

See application file for complete search history.

(56) References Cited

U.S. PATENT DOCUMENTS

| | | | | |
|---|---|---|---|---|
| 3,768,677 A | * | 10/1973 | Moss ........................... | 414/476 |
| 3,817,546 A | * | 6/1974 | Sugiura .................... | 280/43.12 |
| 4,003,583 A | * | 1/1977 | Stanzel ..................... | 280/43.22 |
| 4,934,733 A | | 6/1990 | Smith et al. | |
| 5,232,232 A | * | 8/1993 | Kishi ......................... | 280/43.1 |
| 5,403,024 A | * | 4/1995 | Frketic ..................... | 280/43.12 |
| 5,474,320 A | | 12/1995 | Bojarski et al. | |
| 5,474,416 A | * | 12/1995 | Rogge et al. ................ | 414/482 |
| 6,273,435 B1 | * | 8/2001 | Stringer ................... | 280/6.151 |
| RE37,351 E | | 9/2001 | Crean | |
| 6,502,894 B1 | | 1/2003 | Ingram et al. | |
| 6,540,241 B1 | * | 4/2003 | Lee .......................... | 280/43.12 |
| 6,695,287 B1 | | 2/2004 | De Boer | |
| 6,923,452 B1 | * | 8/2005 | Zachmeier et al. ....... | 280/6.151 |
| 6,945,744 B1 | * | 9/2005 | Swanson .................... | 414/482 |
| 2005/0157785 A1 | * | 8/2005 | Timmermans .............. | 280/656 |

* cited by examiner

*Primary Examiner*—Jeff Restifo
(74) *Attorney, Agent, or Firm*—Law Offices of John Chupa and Associates, P.C.

(57) ABSTRACT

A portable transportation assembly 10 having a pair of wheels 40, 42 which may be selectively raised and lowered and which is adapted to transport a bathroom assembly 200 in an easy and efficient manner.

6 Claims, 4 Drawing Sheets

PORTABLE TRANSPORTATION ASSEMBLY

FIELD OF THE INVENTION

The present invention generally relates to a portable transportation assembly and more particularly, to a portable transportation assembly which is adapted to selectively receive and transport a portable bathroom or other type of article or assembly and which is further adapted to be easily and selectively stored when not in use.

BACKGROUND OF THE INVENTION

A portable bathroom is used in many environments, such as upon a golf course or other generally outdoor location which has limited or no bathroom facilities. One difficulty in the use of such portable bathrooms lies in the transport of such assemblies to these localities. That is, access to these locations is often very difficult to obtain and transportation of these relatively large and bulky portable bathroom assemblies generally requires a relatively large vehicle which has difficulty in accessing and easily and maneuvering around/within the required location or which undesirably damages the ground or other aspects of these locations (e.g., a farm field having no road or a remote golf course location). Such damage is particularly troublesome within golf courses or other areas in which it is important to keep it "pristine".

There is therefore a need for a new and improved assembly which allows a portable bathroom to be easily and efficiently transported to a desired location and which may be later stored when not in use. The present invention provides such an assembly and may be thought of as "portable" since it has wheels which selectively retract for easy storage and since it may be quickly and easily transported to a desired location by a conventional and relatively small motorized vehicle.

SUMMARY OF THE INVENTION

It is a first non-object of the present invention to provide a portable transportation assembly which overcomes the various drawbacks associated with prior transportation assemblies.

It is a second non-limiting object of the present invention to provide a portable transportation assembly which overcomes the various drawbacks associated with prior transportation assemblies and which efficiently and easily allows a portable bathroom assemblies to be transported and placed in a desired location.

It is a third non-limiting object of the present invention to provide a portable transportation assembly which overcomes the various drawbacks associated with prior transportation assemblies, which efficiently and easily allows a portable bathroom assembly to be transported and placed in a desired location, and which may be easily stored when not in use.

According to a first non-limiting aspect of the present invention, a portable transportation assembly is provided. Particularly, the portable transportation assembly includes an assembly having a frame; a pair wheels; a pair of dissimilar axles which are attached to the frame in a spatially offset manner; a pair of members which are each connected to the pair of dissimilar axles and which are further connected to the pair of wheels; and an assembly which is coupled to one of the pair of dissimilar axles and which selectively rotates the one of said pair of dissimilar axles from a first position to a second position, effective to moves the pair of wheels from a first operative and low position to a second raised and storage position.

According to a second non-limiting aspect of the present invention, a portable transportation assembly is provided. Particularly, the portable transportation assembly includes a frame which forms a bed and which has a longitudinal axis of symmetry; a first axle which is operatively disposed through the bed portion and perpendicular to the longitudinal axis of symmetry; a tug portion; a second axle which is operatively disposed through the bed portion and perpendicular to the longitudinal axis of symmetry, the second axle being disposed below the first axle and in front of the first axle toward the tug portion; a pair of wing portions, each of the pair of wing portions receiving the first and the second axles and each of the pair of wing portions being pivotally coupled to the frame; a pair of wheels which are each respectively coupled to a unique and opposed ends of the first axle and the second axle; and an assembly which coupled to the tug portion and to the pair of wing portions and which causes the pair of wing portions to selectively rotate in order to cause the pair of wheels to selectively rotate from a first position below the frame to a second storage position above the frame.

According to a third non-limiting aspect of the present invention, a portable transportation assembly is provided. Particularly, the portable transportation assembly includes a generally rectangular frame; a first axle which is operatively disposed through the frame and which cooperates with the frame to form substantially identical first and second support regions; a first support member which is coupled to a first portion of the frame below the first axle; a second support member which is substantially identical to the first support member and which is coupled to a second portion of the frame and below the first axle; a second axle which traverses only through one of the first and second support regions and which is operatively received within the first and second support members, the second axle being disposed below the first axle; a first wing portion which is coupled to the first and to the second axle; a second wing portion which is coupled to the first and to the second axle; and a movement assembly which is coupled to the second axle and which selectively moves the second axle from a first position to a second position; and a pair of wheels which are coupled to the second axle.

These and other features, aspects, and advantages of the present invention will become apparent from a reading of the following detailed description of the preferred embodiment of the invention and by reference to the following drawings.

DETAILED DESCRIPTION OF THE PREFERRED EMBODIMENT OF THE INVENTION

Figure 1:
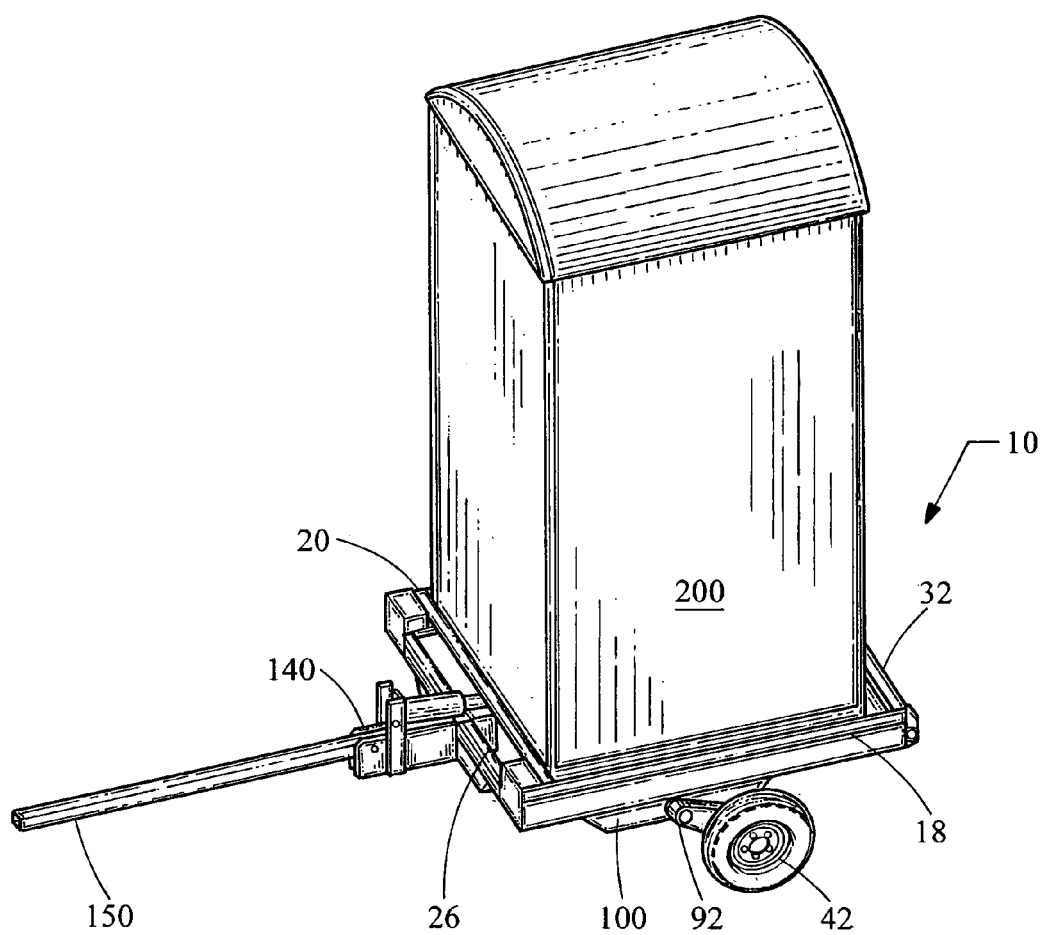
FIG. 1 is a perspective view of a portable transportation assembly which is made in accordance with the teachings of the preferred embodiment of the invention and which is shown as transporting a portable bathroom.
Figure 2:
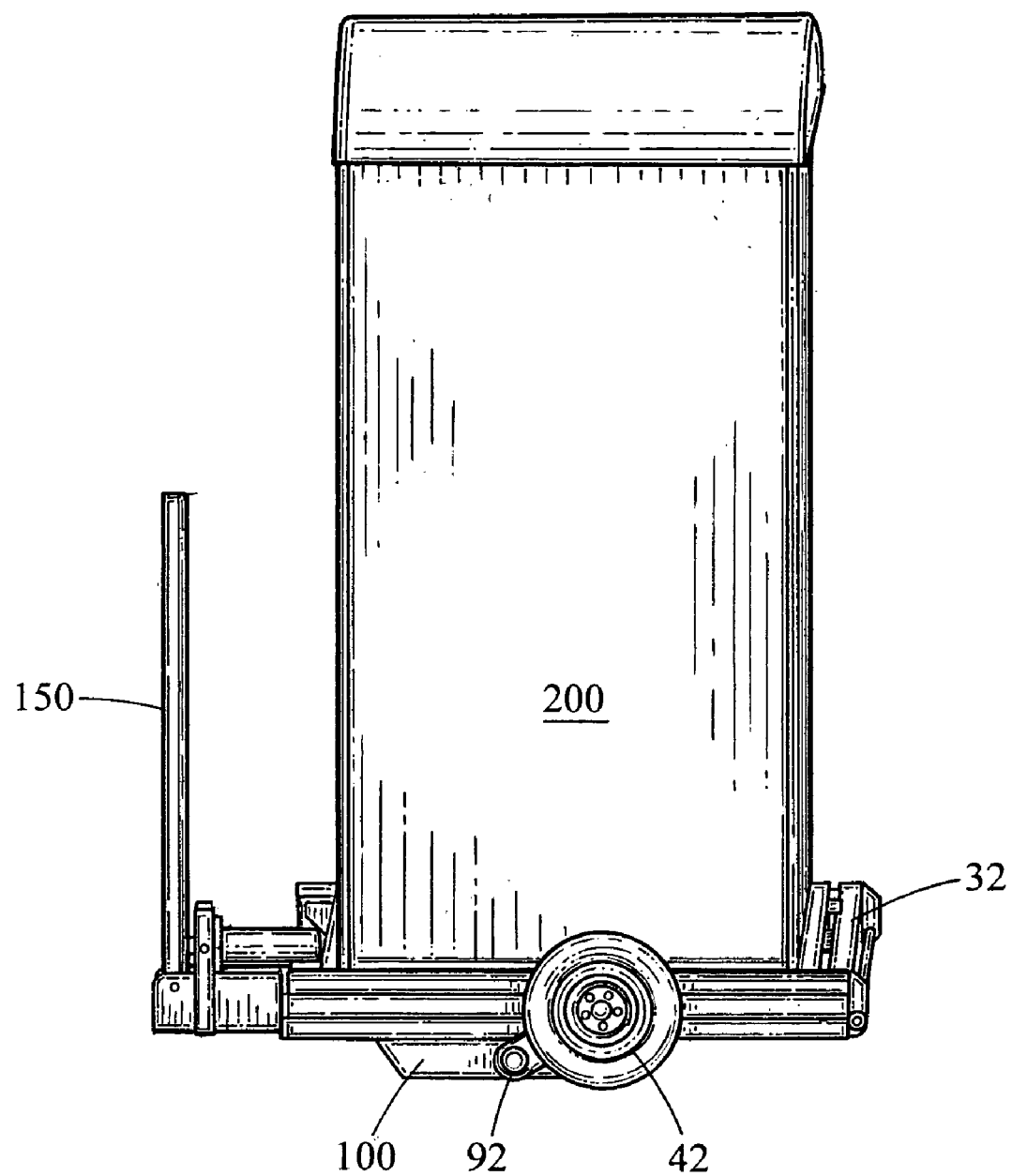
FIG. 2 is a side view of the portable transportation assembly which is shown in FIG. 1.
Figure 3:
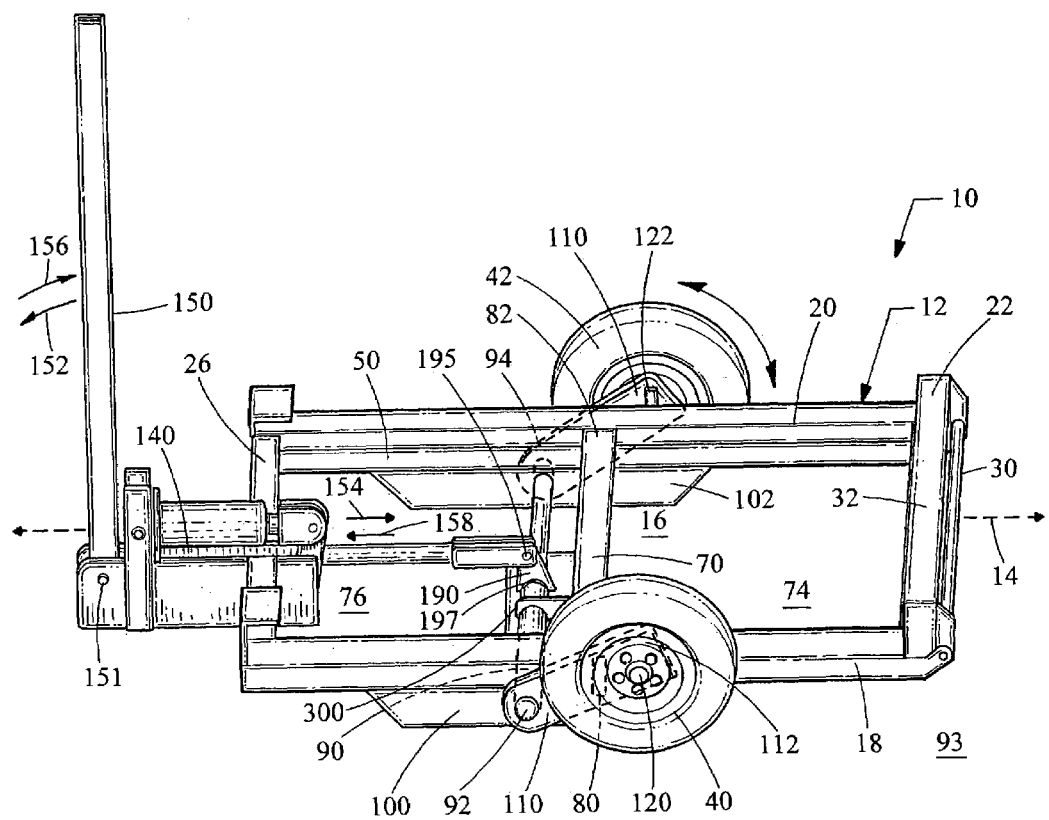
FIG. 3 is a perspective view of a portable transportation assembly which is made in accordance with the teachings of the preferred embodiment of the invention and whose wheels are shown as being selectively moved from a first operative position to a second storage position.
Figure 4:
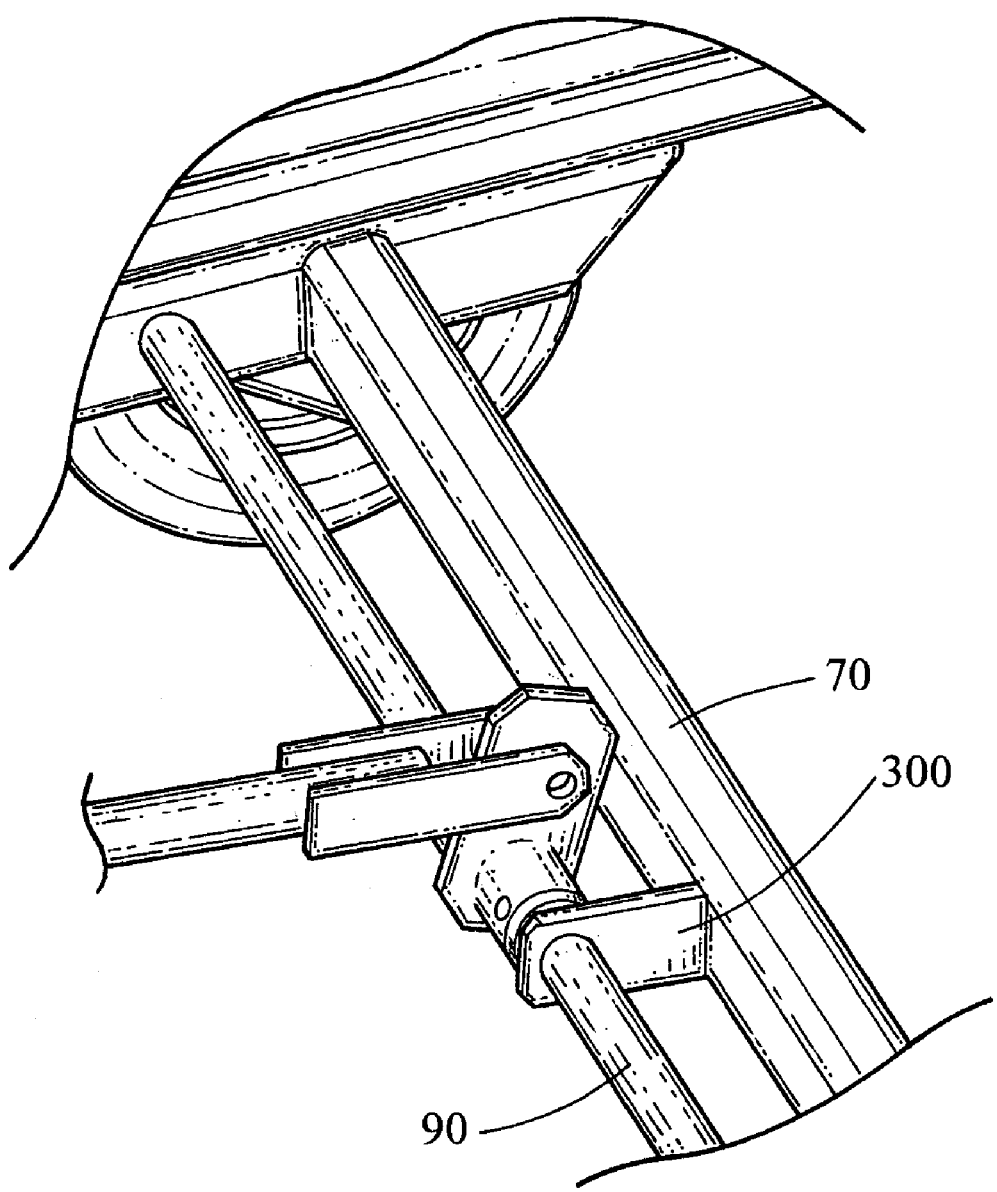
FIG. 4 is a partial cut-away and exploded view of a portion of a portion of the portable transportation assembly which is shown in FIG. 3.

Referring now to FIGS. 1–3, there is shown a portable transportation assembly 10 which is made in accordance with the teachings of the preferred embodiment of the invention.

Particularly, the portable transportation assembly 10 includes a generally rectangular frame or bed portion 12 having, in one non-limiting embodiment of the invention, a longitudinal axis of symmetry 14 and forming a storage bed or storage/transportation/receiving/containment portion 16 and a pair of substantially identical wheels (e.g., wheel and tire assemblies) 40, 42.

By way of example and without limitation, the frame portion 12 is cooperatively formed by a first and a second substantially identical side members 18, 20. In one non-limiting embodiment of the invention, each of the substantially identical side members 18 20 forms a ledge 50 which is longitudinally coextensive to the formed reception and support/containment/reception area 16. Further, as shown, the frame portion 12 includes a bumper or rear member 22 which is coupled to the members 18, 20 (or which may alternatively be integrally formed with the members 18, 20) and a front member 26 which is similarly coupled to (or which may be alternatively integrally formed with) the members 18, 20 and which is distally positioned from the member 22 (e.g., members 22 and 26 are respectively coupled at opposed ends of the members 18, 20 in order to form the desired containment/reception/storage portion 16). The members 22, 26, in one non-limiting embodiment of the invention, are substantially identical and have a generally rectangular cross sectional area. In another non-limiting embodiment of the invention, the bumper or end member 22 is formed from a first generally round member 30 and a second generally rectangular member 32 which "rises" or is positioned a longer distance above the formed portion 16 than does member 26 (e.g., the term "above", in the foregoing context, means in a direction away from the ground 93 upon which the wheels 40, 42 traverse).

The portable transportation assembly 10 includes a first axle member 70 which is operatively disposed within the containment/reception portion 16 and, more particularly, which lies orthogonal to the longitudinal axis of symmetry 14 and which cooperates with the frame assembly 12 to form a first and second substantially identical containment/reception/containment regions or portions 74, 76. The first axle member 70 has opposed ends 80, 82 which are respectively received by and which extends through members 18, 20. The portable transportation assembly 10 further includes a second axle 90 which, in one non-limiting embodiment of the invention, has a dissimilar shape and size than the first axle 70 (i.e., may be thinner than the first axle 70) and which has ends 92, 94 and which is operatively disposed below (e.g., is spatially offset from) the first axle 70. In the foregoing context, the term "below" means that the second axle 92 is positioned closer to the ground 93 upon which the portable transportation assembly 10 traverses than is the first axle 70.

Further, the portable transportation assembly 10 includes substantially similar members 100, 102 which are respectively coupled to members 18, 20 (or which may be alternatively integrally formed with the members 18, 20) and which respectively receive the ends 92, 94, and these ends 92, 94 respectively penetrate the members 100, 102. It should be apparent to those of ordinary skill in the art that the members 100, 102 add strength and support to the overall frame assembly 12, especially in the vicinity of the axle 90. The portable transportation assembly further includes a pair of substantially identical wing members 110, 112 and, more particularly, the member 110 receives the ends 80, 92 and an axle 120 which is coupled to the wheel 40. The member 112 receives the ends 94 and 82, as well as an axle 122 which is coupled to the wheel 42. In one non-limiting embodiment of the invention, each of the substantially identical wing members is elliptically shaped, although other shapes are possible and may be used in alternate embodiments of the invention. In another non-limiting embodiment the ends 80, 82 are not respectively received by the members 110, 112 but terminate within respective members 18, 20.

The portable transportation assembly 10 further includes a hydraulic cylinder assembly 140 which is removably coupled to the member 26 and which is operatively disposed along the longitudinal axis of symmetry 14. The portable transportation assembly 10 further includes a pivot arm assembly 150 which is pivotally coupled to the hydraulic cylinder assembly 140 at pivot point 151 and which, when moved in the direction of arrow 152, causes the assembly 140 to move in the direction of arrow 154 and when moved in the direction of arrow 156 causes the assembly 140 to move in the direction of arrow 158. Further, the hydraulic cylinder assembly 140 is coupled to a motion conversion member 190 and the member 190 is coupled to the axle 90. In one non-limiting embodiment of the invention, the motion conversion member 190 is generally "C" shaped or curved and has an end portion 195 which is coupled to the hydraulic cylinder assembly 140 and a curved reception portion 197 which is coupled to the axle 90. As shown, when the pivot arm 150 is moved in the direction of arrow 156, the hydraulic cylinder assembly 140 moves in the direction of arrow 154 which causes the motion conversion member 190 to rotate the axle 90 in a manner in which the wheels 40, 42 are placed in a raised storage position (shown in phantom in FIG. 3), and when the pivot arm 150 is moved in the direction of arrow 152, the axle 90 is made to rotate, by the conversion member 190, in a manner in which the wheels 40, 42 are placed in a lowered operative position as shown in FIG. 3. In this manner, the assembly 10 may be easily stored when not in use and easily and efficiently made ready for use.

When it is desired to use the portable transportation assembly 10, a portable bathroom assembly, such as assembly 200, is placed upon the ledges 50 of the members 18, 20 (i.e., the ledges 50 extend into the portions 74, 76). The wheels 40, 42 are lowered in the afore-described manner and the pivot arm 150 is coupled to relatively small motor assembly (i.e., a golf cart). In this manner, the assembly 200 may be easily and efficiently transported to a desired location by a relatively small motorized vehicle.

It is to be understood that the present invention is not limited to the exact construction or method illustrated and described above, but that various changes and modifications may be made without departing from the spirit and the scope of the inventions as are described more fully in the following claims. It should be apparent that the assembly 10 may be used to transport any desired apparatus or assembly, other than the portable bathroom assembly 200 and that the pivot arm 150 in combination with the hydraulic cylinder assembly 140 and the member 190 may be considered to be a "tug assembly". Further, it should be appreciated that multiple items may be simultaneously carried by the assembly 10 by use of the two substantially similar reception and containment portions 74, 76. Further, in a non-limiting embodiment, the assembly 10 further includes a bracket portion 300 which movably receives the axle 90 and which couples the axle 90 to the axle 70, further structurally strengthening the assembly 10.

What is claimed is:

1. A portable transportation assembly comprising a generally rectangular frame including a pair of substantially identical and linearly coextensive side members, a front member which is orthogonally coupled to said pair of substantially identical side members, and a rear member, which is orthogonally coupled to said pair of substantially identical side members and which is parallel to said front member; a first axle having a first shape which is parallel to said front and rear members and which is orthogonally and fixedly coupled to a said pair of substantially similar side members; a second axle which is of a second shape and which is parallel to said front and rear members and which is orthogonally and movably coupled to said pair of substantially identical side members and which is disposed below said first axle; a first wheel; a third axle which is coupled to said first wheel; a second wheel; a fourth axle which is coupled to said second wheel; a first wing member which is coupled to a first end of said second axle and to said third axle; a second wing member which is coupled to said fourth axle and to a second end of said second axle; a shaft assembly which is disposed within said frame and which moves only in first and second directions which are each orthogonal to said first and second axles; and a "c" shaped motion conversion portion which is coupled to said second axle and to said shaft assembly and which rotates said second axle in a first rotational direction only upon movement of said shaft assembly in a first direction, effective to cause the first rotational motion to be concurrently communicated to each of said wheels, thereby concurrently raising each of said wheels and which rotates said second axle in a second rotational direction only upon movement of said shaft assembly in a second direction, effective to cause the second rotational motion to be concurrently communicated to each of said wheels, thereby concurrently lowering each of said wheels, when said raising and lowering of said wheels occurs without requiring said frame to be first tipped.

2. The portable transportation of claim 1 wherein said first and second wing members are substantially identical.

3. The portable transportation assembly of claim 2 wherein each of said first and second wing members are elliptical.

4. The portable transportation assembly of claim 3 wherein said shaft assembly comprises a pivot arm member; and a movement portion which is coupled to said pivot arm member.

5. The portable transportation assembly of claim 4 wherein said generally rectangular frame has a longitudinal axis of symmetry and wherein said movement portion is constrained only to reciprocally move along said longitudinal axis os symmetry.

6. The portable transportation assembly of claim 5 wherein said movement portion comprises a hydraulic cylinder.

* * * * *